United States Patent Office.

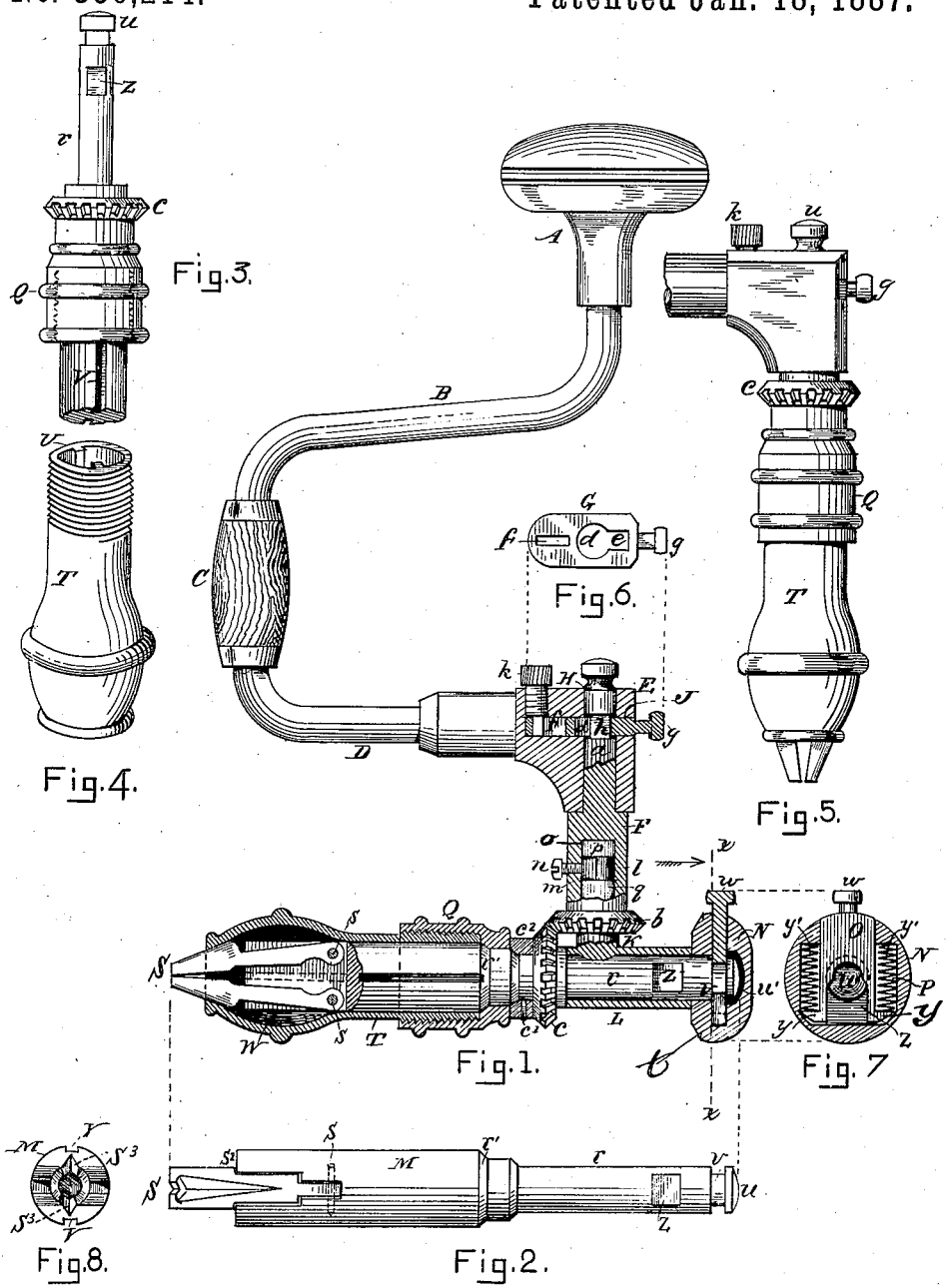

HENRY SMILEY, OF BOSTON, MASSACHUSETTS.

BIT-STOCK.

SPECIFICATION forming part of Letters Patent No. 356,214, dated January 18, 1887.

Application filed May 3, 1886. Serial No. 201,110. (Model.)

*To all whom it may concern:*

Be it known that I, HENRY SMILEY, of Boston, in the county of Suffolk and State of Massachusetts, have invented new and useful Improvements in Bit-Stocks, of which the following, taken in connection with the accompanying drawings, is a specification.

My invention relates to improvements in bit-stocks; and the objects of my improvements are to provide, first, a bit-stock with a removable shaft, that the tool holder or chuck may be used in a parallel plane to the plane of the straight arm; second, to facilitate the adjustment of the jaws of the tool-holder and the bit; third, to hold the bit more securely; and I attain these objects by means of the mechanism illustrated in the accompanying drawings, in which—

Figure 1 is a side elevation of my invention in part section. Fig. 2 is a side elevation of the shaft of the tool-holder and jaws. Fig. 3 is a side elevation of the shaft of the tool-holder and shank, with bevel-gearing and loose jacket. Fig. 4 is an elevation in perspective of the loose barrel. Fig. 5 is a side elevation of the stock or head, with the tool-holder in ordinary position, and loose jacket. Fig. 6 is a top plan of the key used in the stock or head. Fig. 7 is a transverse vertical section showing those parts which are at the right of line $x$ $x$ in Fig. 1. Fig. 8 is a plan of the end of the bit-holder shaft.

I will now describe my invention when the bit is to bore in a plane parallel to the straight arm, as shown in Fig. 1.

In Fig. 1, A is the presser; B, the crank-arm; C, the handle; D, the straight arm; E, the stock or head, constructed with a vertical bore, H, and a horizontal recess, J, into which a key, G, is placed, said key G being better shown in Fig. 6, and having a circular slot, $d$, and square slot $e$, and rectangular slot $f$, and knob $g$. F is a removable shaft, with a solid circular shank, $a$, said shaft F having a square portion, $h$, and bevel-gear $b$. I fasten said shaft F firmly and rigidly into the head E by putting said shank $a$ through said bore H in said head E, and also through the said slot $d$ in said key G, and then pressing said key G into said head E by means of said knob $g$, the square slot $e$ fitting upon the square portion $h$ of said shank $a$, as shown in Fig. 1. I make firm said key G by screw $k$, which passes into the head E and the rectangular slot $f$ (shown in Fig. 6) in key G. Said shaft F has a tubular recess, $o$, in its lower end, to receive an arbor, K, which is cast solid with and forms part of a hollow handle, L. K is an arbor, which, being placed in said recess $o$ of said shaft F, is firmly held in said shaft F by means of a set-screw and channel, as shown in the model filed in the Patent Office, or by means of a channel, $b$, with a shoulder, $p$, above and shoulder, $q$, below, into which channel is fitted a collar, $m$, securely held by a set-screw, $n$, and, preferably, I use said collar, channel, and set-screw, the said shaft F being thus permitted to revolve around said arbor K while boring at different angles in the plane. L is a hollow handle with a head, N, which head N is chambered to contain a spring-key, O, (which spring-key is shown in Fig. 7, and hereinafter described,) with a recess, $t$, in said head N. Said hollow handle $h$ receives a tool-holder shaft, M, the shank $r$ (shown in Fig. 2) of said shaft M passing through said hollow handle $h$, as shown in said Fig. 1, and the head $u$ of said shank $r$ is allowed into the recess $u'$ and kept in position by means of a spring-key, O, which is more fully shown in Fig. 7.

In Fig. 7, O is the spring-key, which has a knob, $w$, and feet $y$ $y$, and an open slot, Z, which is circular at the center. The said spring-key O is pulled outward by means of knob $w$, the springs $y'$ $y'$ being pressed back in the chamber by the feet $y$ $y$, and the slot Z then allows said head $u$ of the shank $r$ to pass into the recess $u'$ of said head N, as shown in Fig. 1, and the knob $w$ being then let go, by means of the springs $y'$ $y'$, the feet $y$ $y$ move back in the chamber, and said spring-key O fitting in an annular way, $v$, of said shank $r$, as shown in Fig. 1, and keeping said shaft M in place, not rigidly, but allowing it to rotate. Upon said shaft M is a bevel-gear, $c$, (shown in Fig. 1,) which said bevel-gear $c$ rotates with bevel-gear $b$ on shaft F. The bevel-gear $c$ is made solid with shoulder $c^2$, and is held rigidly in place by a permanent pin, $c'$, passing through the shoulder $c^2$. Said shoulder $c^2$ prevents a loose jacket, Q, from moving toward shank $r$ of the said shaft M. Q is a loose jacket fitted over the bevel $r'$ of said shaft M, said bevel $r'$ preventing said jacket Q from moving toward the jaws S S. Said loose jacket Q, by means of a screw-thread, moves a loose barrel, T, having a corresponding thread, said loose jacket Q moving with a horizontal motion. T is a loose barrel, which has a spherical chamber, W, at its lower or outer end. Said loose barrel has longitudinal ribs U, (shown in Fig. 4,) which fit into and move along keyways V (shown in Fig. 3) in tool-holder shaft M; or said barrel may be constructed with keyways and said shaft with ribs; but preferably I use the mode above set forth. Said tool-holder shaft M has on each side slots $s^2$, into which fit the jaws S S, each having an angular recess and held in place by pivots s.

The tool-holder shaft M has interior angular recesses, $s^3$, (shown in Fig. 8,) on opposite sides from jaws S S, which receive the opposite angles of any bit placed in said jaws, and so center and assist in holding firmly the bit. When said loose jacket Q is turned by means of said horizontal motion, said loose barrel T is moved back or forward, as may be desired, upon said shaft M, and the loose jaws S S are brought into the narrow or wide part of said spherical chamber W, the space between said jaws S S being accordingly lessened or increased.

Having hereinbefore described the mode of placing into position the several parts of my invention, when it is desired to bore in any angle in the plane parallel with the right arm D, by holding the head of the hollow handle L stationary in the left hand, I turn the bit-stock by the handle C with the right hand. The presser A being placed against the breast and the bevel-gear b acting with the bevel-gear c cause the tool-holder shaft M to rotate the bit, which may be in the jaws S S, said jaws being caused to hold said bit firmly and rigidly by means of the loose jacket Q and loose barrel T, in the manner hereinbefore described. When it is desired to use the bit in the ordinary way in a plane perpendicular to the plane of the straight arm D, the shank r is moved out from the loose handle L. The spring-key O being pulled outward unfastens the head w. The key G being pulled outward (the screw k being loosed) allows the shaft F, with arbor K, to drop out of stock E. Said shank r is then placed in said bore H, passing through the slot d in key G, and the key G being then pushed back, the slot e fits upon the squared portion Z, (shown in Fig. 2,) and the screw k being tightened the tool-holder shaft M is held rigidly in place with the loose jacket Q and loose barrel T thereon, as shown in Fig. 5. It is then operated in the usual manner.

I am aware of Letters Patent No. 95,060, Winkehouse, September 21, 1869, in which a bit shank and socket, each provided with a recess, are held by a bolt connected with a spring passing through them; but I avoid any such recess or bolt, and may hold any bit by my invention, and in a simpler and different manner, without a spring attachment and use jaws.

I am aware of Letters Patent No. 292,587, Richardson, January 29, 1884, in which bevel-gearing, in combination with an independent handle and a ratchet-wheel and pawl, is used; but in my device the bevel-gearing acts by means of an ordinary handle, not independent, and is placed upon a different mechanism and in a different manner, so that the bit may work in a plane parallel to a straight arm, and I avoid the ratchet-wheel and pawl.

I am aware of Letters Patent No. 317,187, Peterson, May 5, 1885, in which bevel-gear is used with a double ratchet device or coupling; but in my device I avoid any ratchet device or coupling.

I am aware of Letters Patent No. 126,395, Ives, May 7, 1872, in which a grooved barrel, in combination with a follower carrying the jaws, is used; but in my device I avoid the use of a follower, and hold the jaws stationary on the tool-holding shaft, and the barrel in my device works upon the shaft and not upon the jaws.

I am aware of Letters Patent No. 305,090, Marr and Laughlin, September 16, 1884, in which is a stem with bevel-gear working with gear on a horizontal stem, and a yoke and lock-bar on the brace. In my device I avoid any yoke and lock-bar, and also avoid two stems and two bevel-gears, and use a bevel-gear in a different manner on a different mechanism.

I am aware that bevel-gear has been used before in connection with bit-stocks; but I am not aware that it has been used in combination with an adjustable arbor, in the manner hereinbefore described, to enable a bit-holding shaft to be placed for use in a plane parallel to a right arm, and used in the manner hereinbefore described.

I am aware that a loose jacket has been used in bit-stocks; but in all these the follower sets upon the jaws directly, and I am not aware that a loose jacket has been used acting upon a loose barrel, the jaws being pivoted on a shaft.

What I claim, and desire to secure by Letters Patent, is—

1. In a bit-stock, the combination of the head E, having a vertical bore and horizontal recess or chamber, with the key G, slotted to receive and hold a recessed shank, and adjusted in the horizontal recess of said head by knob g and fastened by screw k, all substantially as set forth.

2. In a bit-stock, in combination, the hollow handle L, having recessed head N, the spring-key O, arranged and operating, as described, in said head N, and the tool-holder shaft M, held in said hollow handle by said spring-key O fitting into a recess, u, upon the shank of said shaft.

3. In a bit-stock, in combination, the head E, the removable shaft F, with bevel-gear b thereon, the key G, fastening said shaft into said head, as described, the hollow handle L, with arbor K, arranged to operate in the recess of shaft F, the tool-holder shaft M, with pivoted jaws S S, spring-key O, arranged to hold said shaft M in said handle L, bevel-gear

*c*, fixed on said shaft M and engaging and operating with gear *b*, the loose jacket Q, and the loose barrel T, arranged to be operated by a screw-thread engaging with the screw-thread on loose jacket Q, and having ribs moving in keyways of said shaft M, all substantially as described, and for the purpose set forth.

4. In a bit-stock, the combination of the tool-holder shaft M, having pivoted jaws, with loose barrel T, having ribs to move in keyways on shaft, and a chamber, W, to allow said jaws to open and close, and provided with an external screw-thread, and the loose jacket Q, provided with an internal screw-thread to move said loose barrel and secured on said shaft M, but allowed to rotate, all substantially as described and shown.

In testimony whereof I have signed my name to this specification, in the presence of two subscribing witnesses, on this 27th day of April, A. D. 1866.

HENRY SMILEY.

Witnesses:
W. HAYNES,
GEO. M. BIRD.